United States Patent

Hirschmann et al.

Patent Number: 6,054,193
Date of Patent: Apr. 25, 2000

[54] SUPERTWIST LIQUID-CRYSTAL DISPLAY

[75] Inventors: Harald Hirschmann; Marcus Reuter, both of Darmstadt; Volker Reiffenrath, Rossdorf, all of Germany

[73] Assignee: Merck Patent Gesellschaft mit Beschrankter Haftung, Germany

[21] Appl. No.: 09/110,436

[22] Filed: Jul. 6, 1998

[30] Foreign Application Priority Data

Jul. 4, 1997 [DE] Germany .............................. 197 28 615

[51] Int. Cl.⁷ .......................... C09K 19/02; C09K 19/12; C09K 19/30; G02F 1/1333
[52] U.S. Cl. .................. 428/1; 252/299.61; 252/299.63; 252/299.66; 252/299.67; 349/178; 349/179; 349/180; 349/182
[58] Field of Search ......................... 252/299.01, 299.61, 252/299.63, 299.66, 299.67; 349/178, 179, 180; 428/101, 1

[56] References Cited

U.S. PATENT DOCUMENTS

| | | | |
|---|---|---|---|
| 5,178,790 | 1/1993 | Weber et al. | 252/299.01 |
| 5,702,640 | 12/1997 | Junge et al. | 252/299.01 |
| 5,762,825 | 6/1998 | Tsubata et al. | 252/299.6 |

*Primary Examiner*—Shean C. Wu
*Attorney, Agent, or Firm*—Millen, White, Zelano & Branigan, P.C.

[57] ABSTRACT

Supertwist liquid-crystal displays having excellent properties are obtained if the nematic liquid-crystal mixture comprises at least one compound of the formula I:

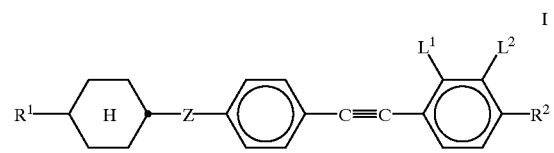

and at least one compound of the formula I*:

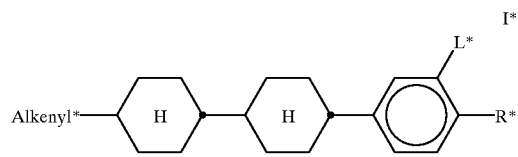

in which
  $R^1$ is alkyl, alkoxy, alkenyl or alkenyloxy having 1 to 12 carbon atoms,
  $R^2$ is alkyl or alkoxy having 1 to 8 carbon atoms,
  Z is —COO—, —CH$_2$CH$_2$ or a single bond,
  one of the radicals $L^1$ and $L^2$ is F and the other is H,
  Alkenyl* is an alkenyl radical having up to 7 carbon atoms,
  L* is H or F, and
  R* is F or an alkyl group having 1 to 12 carbon atoms which is unsubstituted or non-substituted.

18 Claims, No Drawings

SUPERTWIST LIQUID-CRYSTAL DISPLAY

BACKGROUND OF THE INVENTION

The invention relates to supertwist liquid-crystal displays (SLCD) having very short response times and good steepnesses and angle dependencies, and to the novel nematic liquid-crystal mixtures used therein.

SLCDs as defined in the preamble are known, for example from EP 0 131 216 B1; DE 34 23 993 A1; EP 0 098 070 A2; M. Schadt and F. Leenhouts, 17th Freiburg Congress on Liquid Crystals (8-10.04.87); K. Kawasaki et al., SID 87 Digest. 391 (20.6); M. Schadt and F. Leenhouts, SID 87 Digest 372 (20.1); K. Katoh et al., Japanese Journal of Applied Physics, Vol. 26, No. 11, L 1784–L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term SLCD here covers any more highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electrooptical characteristic line and consequently better contrast values, and by significantly less angle dependence of the contrast. Of particular interest are SLCDs having very short response times, in particular also at relatively low temperatures. In order to achieve short response times, the rotational viscosities, in particular, of the liquid-crystal mixtures were hitherto optimized using usually monotropic additives having relatively high vapor pressure. However, the response times achieved were not adequate for all applications.

In order to achieve a steep electrooptical characteristic line, the liquid-crystal mixtures should have relatively large values for $K_{33}/K_{11}$ and relatively small values for $\Delta\epsilon/\epsilon\perp$. The ratio $K_{33}/K_{11}$ (bend elastic constant/splay elastic constant) mainly determines the steepness of the electrooptical characteristic.

In addition to optimization of the contrast and the response times, further important requirements are made of mixtures of this type:

1. A broad d/p window
2. High long-term chemical stability
3. High electrical resistance
4. Low frequency dependence and temperature dependence of the threshold voltage.
d: Layer thickness (separation of the plane parallel outer plates);
p: Natural pitch of the chiral nematic liquid-crystal mixture.

The parameter combinations achieved are still far from adequate, in particular for high-multiplex STNs (1/400). This is in some cases attributable to the fact that the various requirements are affected in opposite manners by material parameters.

There thus continues to be a great demand for SLCDs having very short response times and at the same time a large operating temperature range, high characteristic line steepness, good angle dependence of the contrast and low threshold voltage which meet the abovementioned requirements.

The invention has as an object providing SLCDs which do not have the above-mentioned disadvantages, or only do so to a lesser extent, and at the same time have very short response times.

SUMMARY OF THE INVENTION

It has now been found that these objects can be achieved if nematic liquid-crystal mixtures are used which comprise at least one tolan compound of the formula I and at least one alkenyl compound of the formula I*.

Mixtures comprising compounds of the formula I give significantly shorter response times than mixtures comprising analogous unfluorinated compounds, while having comparable clearing points, threshold voltages and steepnesses.

The invention thus relates to a supertwist liquid-crystal display having
two plane-parallel outer plates which, together with a frame, form a cell,
a nematic liquid-crystal mixture of positive dielectric anisotropy which is present in the cell,
electrode layers with superposed alignment layers on the insides of the outer plates,
a pitch angle between the longitudinal axis of the molecules at the surface of the outer plates and the outer plates of from about 1 degree to 30 degrees, and
a twist angle of the liquid-crystal mixture cell from alignment layer to alignment value of between 100 and 600°, a nematic liquid-crystal mixture comprising
a) 10–65% by weight of a liquid-crystalline component A consisting of one or more compounds having a dielectric anisotropy of greater than +1.5;
b) 20–90% by weight of a liquid-crystalline component B consisting of one or more compounds having a dielectric anisotropy of between −1.5 and +1.5;
c) 5–35% by weight of a liquid-crystalline component T consisting of one or more compounds containing a tolan-4,4'-diyl unit, and
d) an optically active component C in such an amount that the ratio between the layer thickness (separation of the plane-parallel outer plates) and the natural pitch of the chiral nematic liquid-crystal mixture is from about 0.2 to 1.3,
characterized in that component T comprises at least one compound of the formula I:

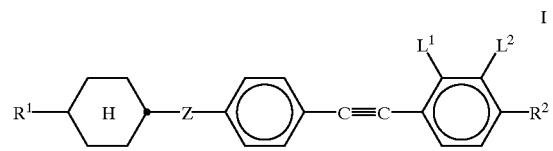

in which
$R^1$ is alkyl, alkoxy, alkenyl or alkenyloxy having 1 to 12 carbon atoms,
$R^2$ is alkyl or alkoxy having 1 to 8 carbon atoms,
Z is —COO—, —CH$_2$CH$_2$— or a single bond,
one of the radicals $L^1$ and $L^2$ is F
and the other is H, and the liquid-crystal mixture additionally comprises at least one compound of the formula I*:

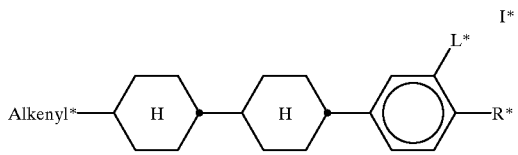

in which
Alkenyl* is an alkenyl radical having up to 7 carbon atoms,
L* is H or F, and
R* is F or an alkyl group having 1 to 12 carbon atoms which is unsubstituted, monosubstituted by $CF_3$ or at least monosubstituted by F, where, in addition, 1 or 2 non-adjacent $CH_2$ groups may be replaced by —O—, —CH=CH—, —CO—, —OCO— or —COO—.

Hereinafter, all tolan compounds present in the mixtures according to the invention come under component T.

The invention also relates to corresponding liquid-crystal mixtures for use in SLCDs.

Preferred compounds of the formula I are, in particular, the compounds of the subformulae IA and IB:

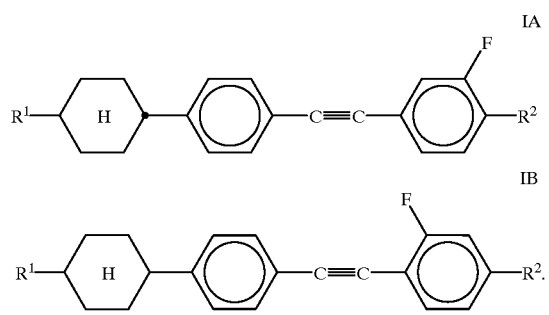

$R^1$ and $R^2$ are preferably straight-chain alkyl having 1 to 5 carbon atoms, furthermore straight-chain alkoxy having 1 to 5 carbon atoms.

Preferred compounds of the formula I* are, in particular, compounds of the subformulae I*A to I*C:

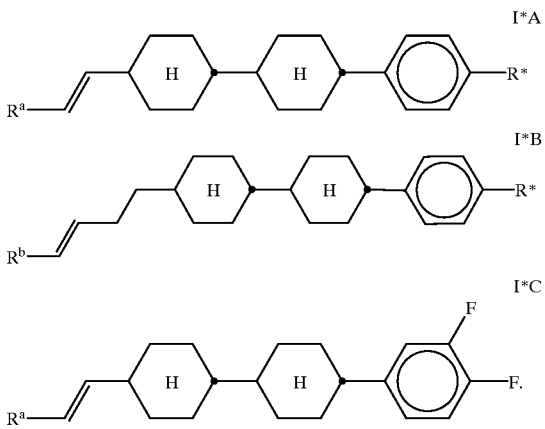

$R^a$ is preferably H or straight-chain alkyl having 1 to 5 carbon atoms.
$R^b$ is preferably H or straight-chain alkyl having 1 to 3 carbon atoms.

R* has the meaning given under the formula I* and is preferably a straight-chain alkyl group having 1 to 5 carbon atoms which is unsubstituted, monosubstituted by $CF_3$ or at least monosubstituted by F.

Component A preferably comprises compounds of the formula A1 and/or A2:

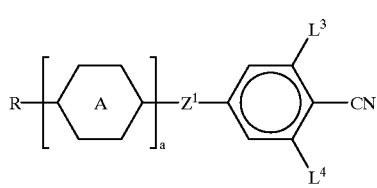

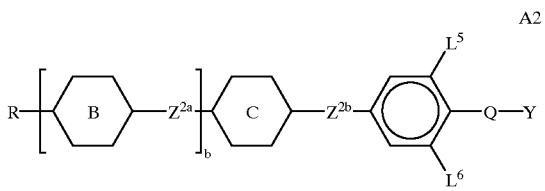

in which

R is an alkyl group having 1 to 12 carbon atoms, in which, in addition, one or two non-adjacent $CH_2$ groups may be replaced by —O—, —CH=CH—, —CO—, —OCO— or —COO—,

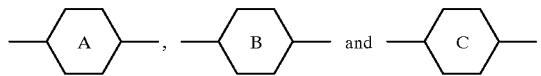

are each, independently of one another,

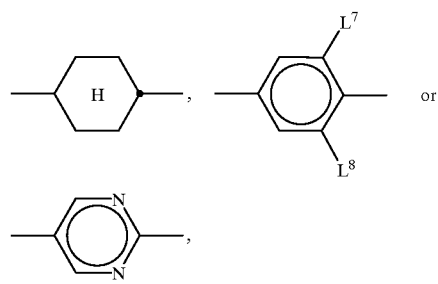

$L^3$–$L^8$ are each, independently of one another, H or F.

$Z^1$, $Z^{2a}$ and $Z^{2b}$ are each, independently of one another, —COO—, —$CH_2CH_2$— or a single bond, Q is —$CF_2$—, —CHF—, —$OCF_2$—, —OCHF— or a single bond, Y is F or Cl, a is 1 or 2, and b is 0 or 1.

Preferred compounds of the formula A1 conform to the subformulae A1a to A1e:

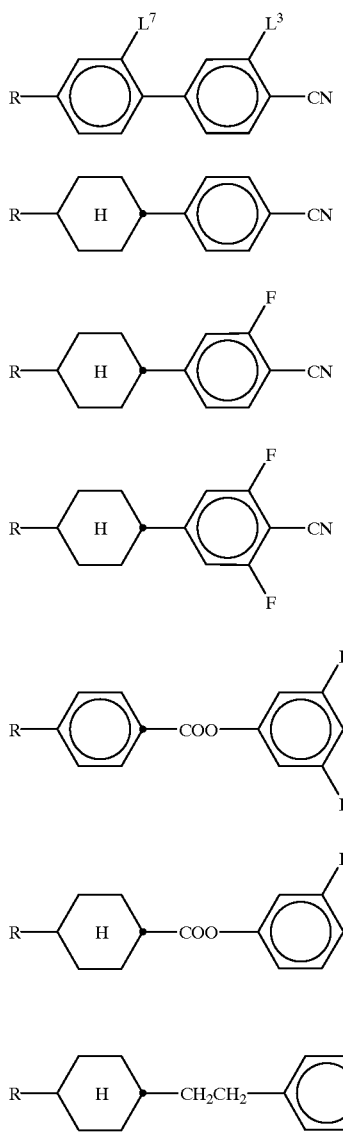

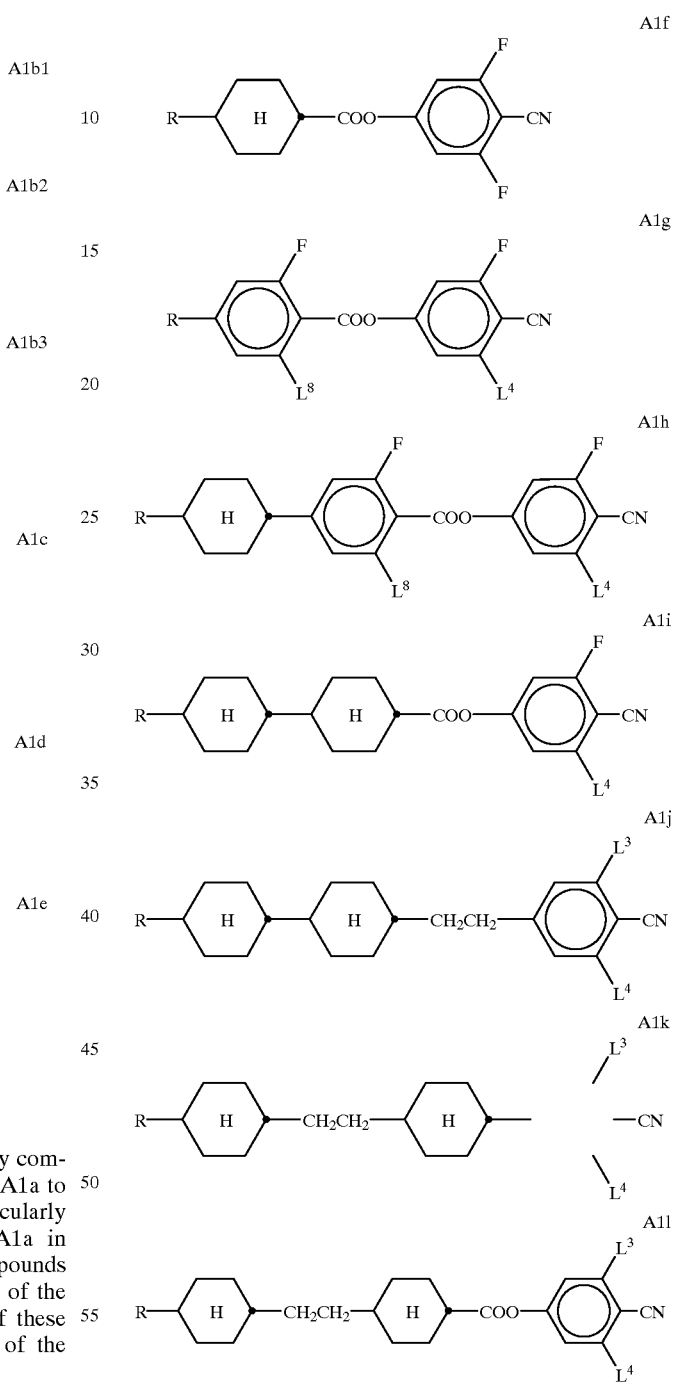

in which
R, $L^3$, $L^4$ and $L^7$ are as defined above.

The mixtures according to the invention preferably comprise from 5 to 50% of compounds of the formulae A1a to A1e. The mixtures according to the invention particularly preferably comprise compounds of the formula A1a in which $L^3$ and $L^7$ are H or $L^3$ is H and $L^7$ is F, compounds of the formulae A1b1, A1b2 and A1b3, compounds of the formula A1c in which $L^3$ and $L^4$ are H or one of these radicals is H and the other is F, and compounds of the formula A1e in which $L^3$ is H.

Of the compounds of the formulae A1a to A1e, particular preference is given to the compounds of the formulae A1b1, A1b2 and A1b3, and to the abovementioned compounds of the formulae A1a and A1c which are particularly preferably present in the mixtures according to the invention.

Component A particularly preferably comprises one or more compounds of the formula A1b1 and, if desired, one or more compounds of the formula A1c in which one of the radicals $L^3$ and $L^4$ is H and the other is F.

Component A furthermore preferably comprises the following compounds of the formulae A1f to A1l:

in which
R, $L^3$, $L^4$ and $L^8$ are as defined above.

Preferred compounds of the formula A2 conform to the subformulae A2a to A2f:

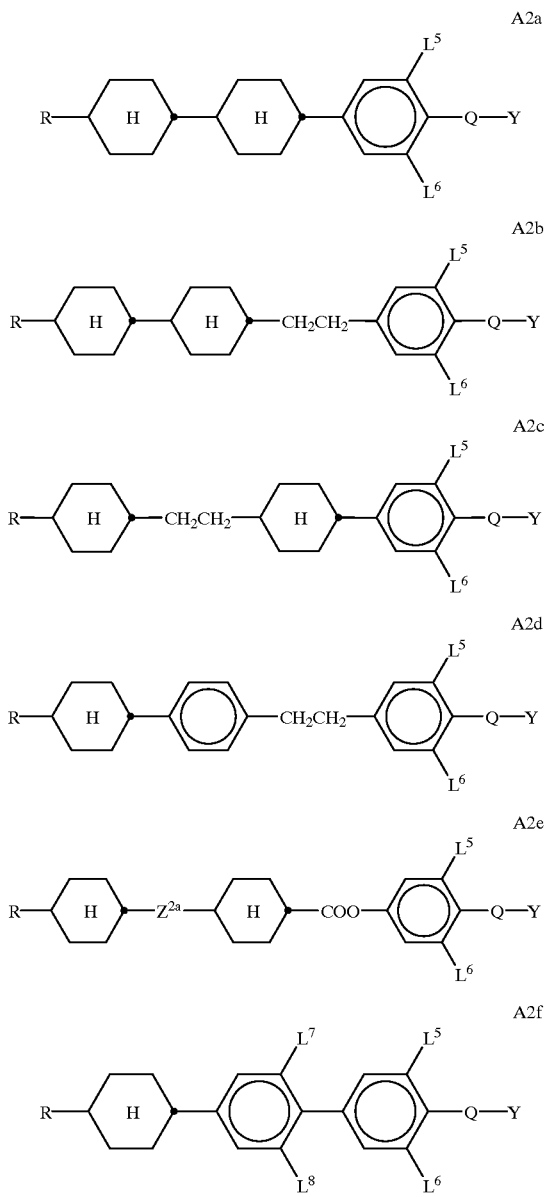

in which

R, $L^5$, $L^6$, $L^7$ and $L^8$ are as defined above, $Z^2a$ is a single bond or —CH$_2$CH$_2$—, and —Q—Y is F, Cl, CF$_3$, OCF$_3$ or OCHF$_2$, where, in the compounds of the formula A2a in which R is alkenyl and one of the radicals $L^5$ and $L^6$ is H, —Q—Y is Cl.

In the compounds of the formula A2e, $Z^{2a}$ is preferably a single bond.

Of the compounds of the formulae A2a to A2f, particular preference is given to those in which —Q—Y is F, and $L^5$ and $L^6$ are each, independently of one another, H or F, in particular those in which —Q—Y and $L^5$ are F, and $L^6$ is H or F. Of these compounds, particular preference is given to the compounds of the formulae A2a1, A2b1, A2e1 and A2f1:

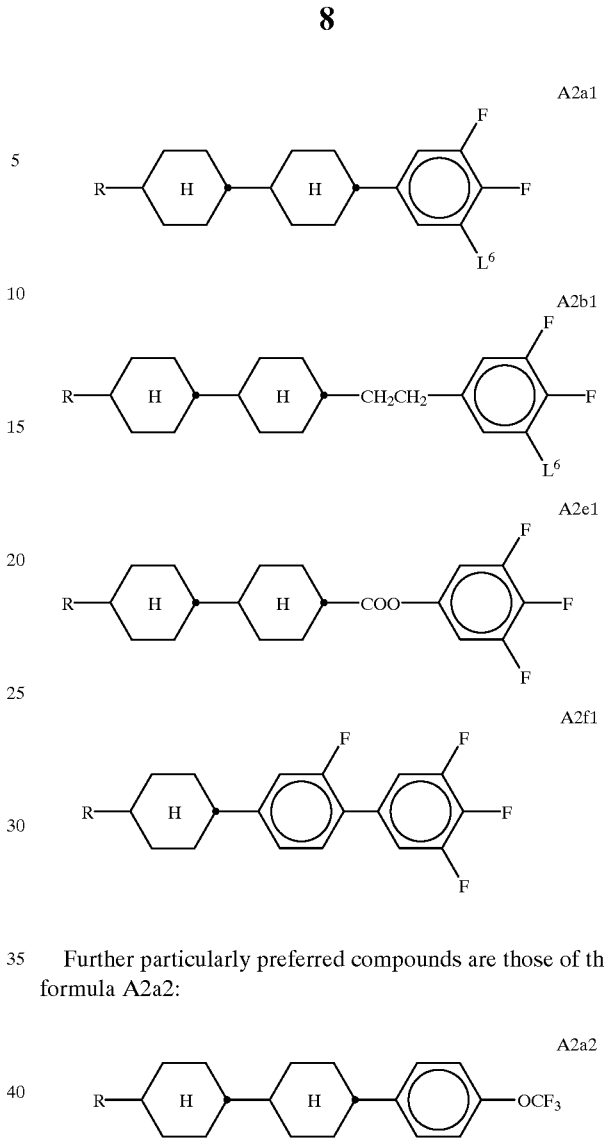

Further particularly preferred compounds are those of the formula A2a2:

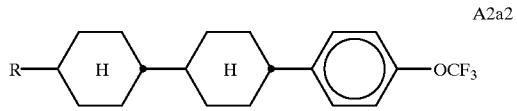

Besides one or more compounds of the formulae I and I*, preferred mixtures comprise one, two, three or more compounds of the formulae A1a, A1b1 to A1b3, A1c, A2a, A2b and A2c, preferably one to four compounds of the formulae I and I* and one to four compounds of the formulae A1b1 to A1b3 and A1c, and one or more compounds of the formulae A2a1, A2a2 and A2b1.

R is preferably straight-chain alkyl having 1 to 7 carbon atoms, vinyl or 1E- or 3E-alkenyl having 3 to 7 carbon atoms.

Especially preferred mixtures comprise one or more compounds selected from the group consisting of the compounds of the formulae A2b, A2c, and A2e in a total proportion of from about 5 to 35%. All percentages given relate to the total liquid crystal mixture unless expressly stated otherwise in the text.

In a particularly preferred embodiment, the mixtures according to the invention comprise, besides compounds of the formulae A2b, A2c and A2e, further terminally fluorinated compounds, for example selected from the group consisting of the compounds of the formulae A2g to A2j:

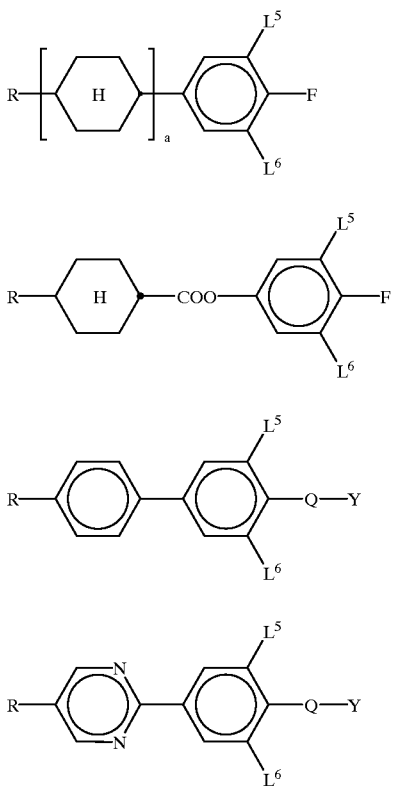

A2g

A2h

A2i

A2j in which R is preferably n-alkyl having 1 to 7 carbon atoms or (trans)-n-alkenyl having 3 to 7 carbon atoms, a is 1 or 2, Q—Y is preferably F, Cl, $CF_3$, —$OCF_3$ or —$OCHF_2$, and $L^5$ and $L^6$ are H or F.

Especially preferred halogenated compounds in the component A are those of the formula A3:

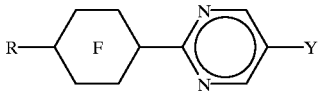

A3 in which
R and Y are as defined above, and

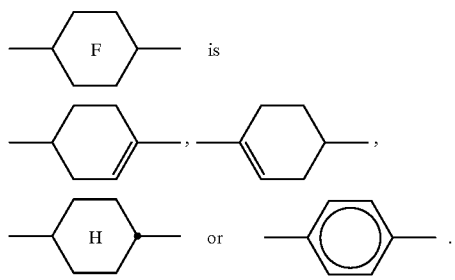

The total proportion of all terminally fluorinated compounds is preferably from about 5 to 65%, in particular from about 15 to 40%.

The individual compounds, for example of the formulae I, I*, A1 and A2, or their subformulae, or other compounds which can be used in the SLCDs according to the invention, are either known or can be prepared analogously to the known compounds.

Component B preferably comprises one or more compounds selected from the group consisting of the compounds of the formulae B1 to B5:

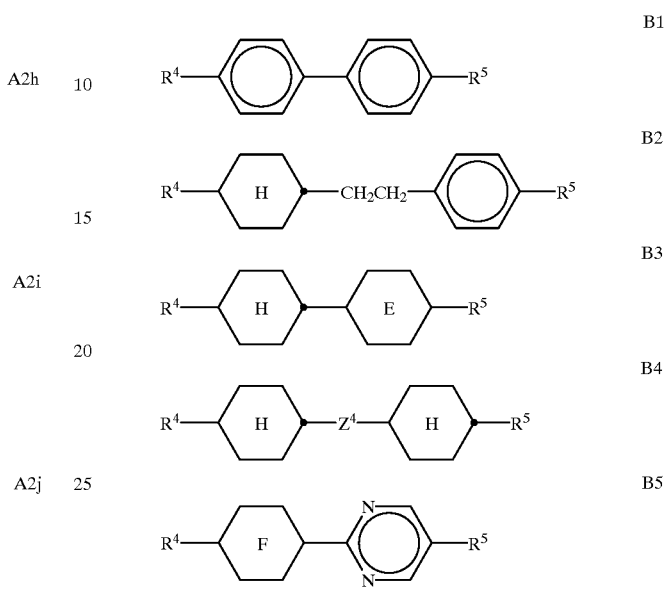

B1

B2

B3

B4

B5 in which $R^4$ and $R^5$ are each, independently of one another, as defined for R, $Z^4$ is —$CH_2CH_2$—, —CO—O— or a single bond,

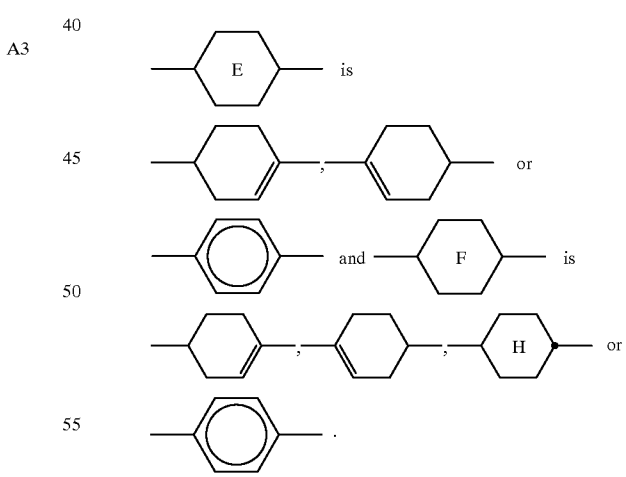

Particularly preferred compounds of the formula B4 are those of the following subformulae B4a and B4b:

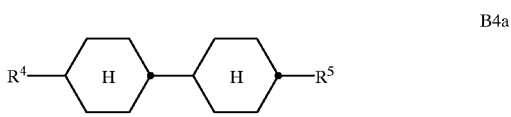

B4a

-continued

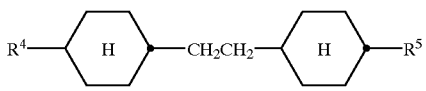
B4b in which

R⁴ is CH₃—(CH₂)$_p$—, CH₃—(CH₂)$_o$—O—, CH₃—(CH₂)$_o$—O—CH₂—, trans-H—(CH₂)$_q$—CH=CH—(CH₂CH₂)$_b$— or trans-H—(CH₂)$_q$—CH=CH—(CH₂CH₂)$_b$—CH₂O—, R⁵ is CH₃—(CH₂)$_p$- or trans-H—(CH₂)$_q$—CH=CH—(CH₂CH₂)$_b$—, o is 1, 2, 3 or 4,
q is 0, 1, 2 or 3,
b is 0 or 1, and
p is 1, 2, 3 or 4.

Particular preference is given to compounds of the formula B4 in which one of the radicals R⁴ and R⁵ is CH₃—(CH₂)—O— or CH₃—(CH₂)$_o$—O—CH₂—.

Especially preferred compounds of the formula B4 are those of the formula B4a in which R⁴ and R⁵ are each, independently of one another, trans-H—(CH₂)$_q$—CH=CH—(CH₂CH₂)$_b$— or R⁴ is trans-H—(CH₂)$_q$—CH=CH—(CH₂CH₂)$_b$— and R⁵ is CH₃—(CH₂)$_p$—, and b is 0 or 1, q is 0, 1, 2 or 3, and p is 1, 2, 3 or 4.

Preference is furthermore given to the compounds of the subformula B4c:

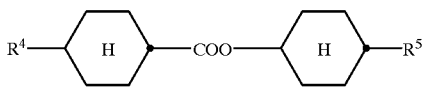
B4c in which R⁴ and R⁵ are each, independently of one another, as defined above.

The proportion of the compounds of the formula B4 of the abovementioned subformulae is preferably from about 5 to 45%, particularly preferably from about 10% to 35%.

Particularly preferred compounds of the formula B3 are those of the following subformula B3a:

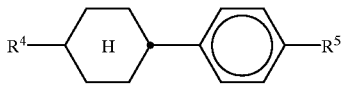
B3a in which

R⁴ is CH₃—(CH₂)$_o$—O— or trans-H—(CH₂)$_q$CH=CH—(CH₂CH₂)$_b$—CH₂O—, and

R⁵ is CH₃—(CH₂)$_p$—, where o is 1, 2, 3 or 4,
q is 0, 1, 2 or 3,
b is 0 or 1, and
p is 1, 2, 3 or 4.

The proportion of these compounds or of the compounds of the formula B3 is preferably from about 5 to 40%, particularly preferably from about 10 to 35%.

In a particularly preferred embodiment, the mixtures simultaneously comprise compounds of the formulae B3 and B4, the total proportion of the compounds of the formulae B3 and B4 as above being maintained, i.e., the total of B3 plus B4 is 5 to 45%.

If compounds of the formula B4 are present, R⁴ and R⁵ are particularly each, independently of one another, n-alkyl having 1 to 7 carbon atoms, vinyl or (trans)-n-alkenyl having 3 to 7 carbon atoms. Z⁴ is preferably a single bond.

Preference is furthermore given to mixtures according to the invention which comprise one or more compounds of the formula B3 in which

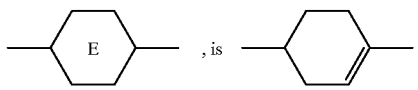

or

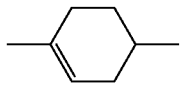

and R⁴ and R⁵ have one of the preferred meanings given above, particularly preferably are n-alkyl having 1 to 7 carbon atoms.

In all cases, the total proportion of the compounds of the formula B3 and B4 as above is maintained.

The proportion of the compounds of the formulae B3 and B4 together is preferably from 10 to 50%, in particular from 15 to 40%.

Compounds of the formulae B3 and B4 are preferred.

The proportion of pyrimidyl compounds of the formulae A3 and B5 is preferably from about 5 to 30%, particularly preferably from about 10 to 20%. R is preferably n-alkyl or n-alkoxy, in each case having 1 to 9 carbon atoms. However, it is also possible to employ analogous compounds containing alkenyl or alkenyloxy groups. Compounds of the formula B5 are preferred.

Component B especially preferably additionally comprises one or more compounds selected from the group consisting of the compounds of the formulae B6 to B13:

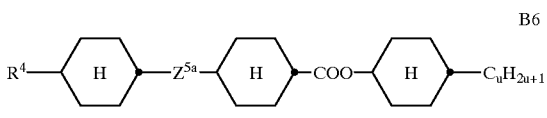
B6

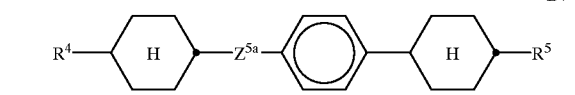
B7

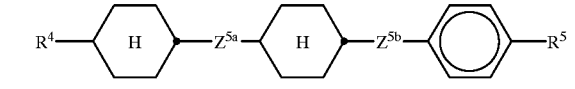
B8

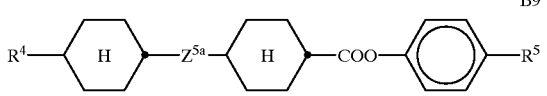
B9

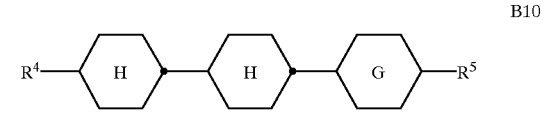
B10

-continued

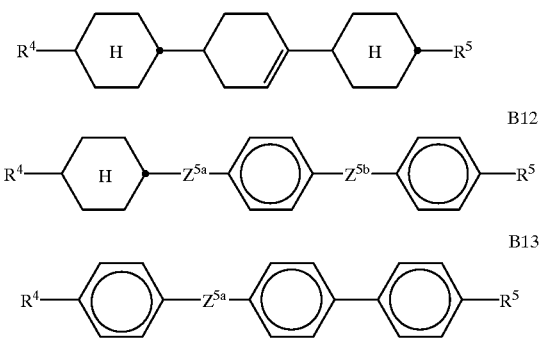

in which

R$^4$ and R$^5$ are as defined for R,

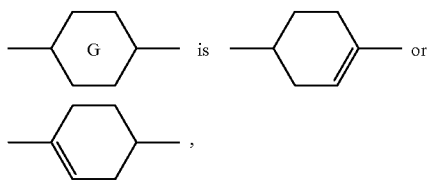

Z$^{5a}$ and Z$^{5b}$ are each, independently of one another, a single bond or —CH$_2$CH$_2$—, and u is from 1 to 12, and the 1,4-phenylene broups in B7, B8, B9, B12 and B13 may also each, independently of one another, be monosubstituted or polysubstituted by fluorine. The compounds of formula B8 are different from the compounds of formula I$^*$.

In the compounds B6 and B9, Z$^{5a}$ is preferably a single bond. R$^4$ is preferably n-alkyl having 1 to 7 carbon atoms or trans-n-alkenyl having 3 to 7 carbon atoms.

Particular preference is given to mixtures comprising one or more compounds of the formula B12 in which Z$^{5a}$ and Z$^{5b}$ are a single bond, R$^4$ is particularly preferably vinyl, 1E-propenyl, 1-butenyl, 2E-butenyl, 2E-pentenyl or 3E-pentenyl, and R$^5$ is simultaneously alkyl having 1 to 4 carbon atoms, particularly preferably methyl, ethyl or propyl, especially preferably methyl or ethyl.

In a further preferred embodiment, component B additionally comprises one or more compounds selected from the group consisting of the compounds of the formulae B11 to B13:

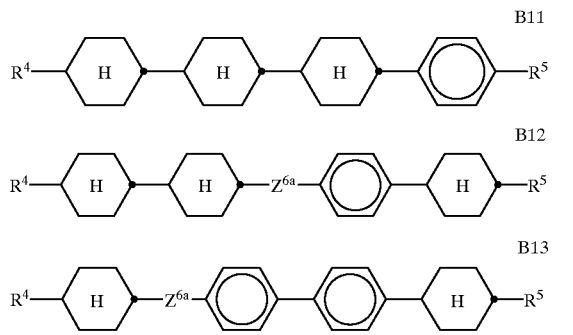

in which R$^4$ and R$^5$ are as defined for R, Z$^{6a}$ is a single bond, —CH$_2$CH$_2$— or —COO—, Z$^{6b}$ is a single bond or —CH$_2$CH$_2$—, and the 1,4-phenylene groups in B11 to B13 may also each, independently of one another, be monosubstituted or polysubstituted by fluorine.

In a further preferred embodiment, component B comprises one or more compounds selected from the group consisting of the compounds of the formulae B14 and B15:

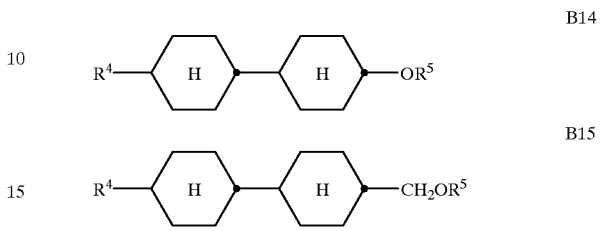

in which R$^4$ and R$^5$ are as defined for R.

If desired, the liquid-crystalline mixtures comprise an optically active component C in such an amount that the ratio between the layer thickness (separation of the plane-parallel outer plates) and the natural pitch of the chiral nematic liquid-crystal mixture is greater than 0.2. For component C, a multiplicity of chiral dopants, some of which are commercially available, is available to the person skilled in the art, for example cholesteryl nonanoate, S-811 from Merck KGaA, Darmstadt, FRG, and CB15 (BDH, Poole, UK). The choice of dopants is not crucial per se.

In a particularly preferred embodiment, the mixtures according to the invention comprise from about 5 to 35%, in particular from 8 to 20%, of liquid-crystalline tolan compounds. This allows smaller layer thicknesses to be used, significantly shortening the response times. Particular preference is given to mixtures which, in addition to the compounds of the formula I, comprise one or more further tolan compounds selected from group T consisting of the compounds of the formulae T1 and T2:

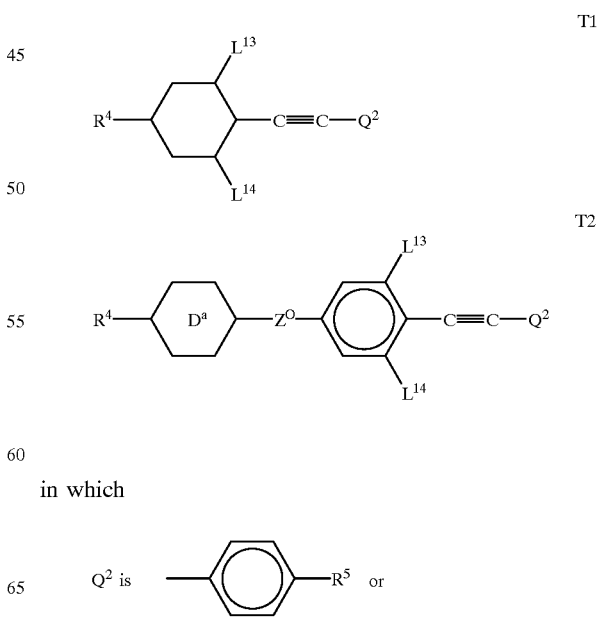

in which

Q$^2$ is

-continued

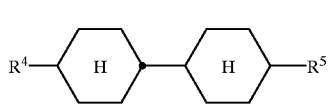

$Z^0$ is —COO—, —CH$_2$CH$_2$— or a single bond, $L^{11}$–$L^{14}$ are each, independently of one another H or F, Q is —CF$_2$—, —CHF—, —OCF$_2$—, —OCHF or a single bond, and Y is F or Cl, and $R^4$ and $R^5$ are each, independently of one another, as defined for R.

The proportion of the compounds from group T is preferably from 5 to 30%, in particular from 5 to 20%.

Preferred tolans of the formulae T1 and T2 are those in which $R^4$ is n-alkyl or n-alkoxy having 1 to 7 carbon atoms, $R^5$ is as defined for $R^4$ or is n-alkenyl or n-alkenyloxy, in each case having 3 to 7 carbon atoms, one of the radicals $L^{11}$ and $L^{12}$ is H and the other is H or F, $L^{13}$ and $L^{14}$ are H, $Z^0$ is —CH$_2$CH$_2$— or a single bond, and —Q—Y is F, Cl or OCF$_3$.

In a preferred embodiment, component T, besides the compounds of the formula I, comprises one or more other tolan compounds of the formulae T1a to T2b:

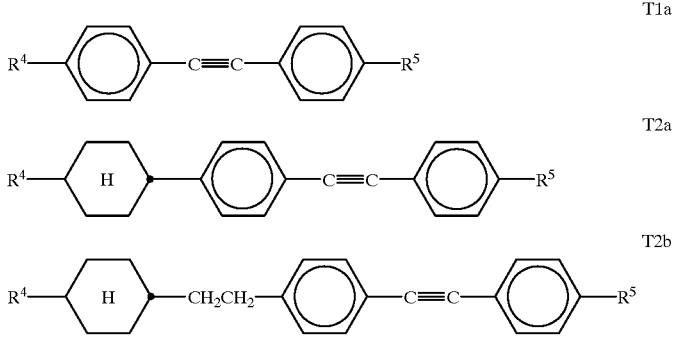

in which
$R^4$ is preferably an alkyl radical having 1 to 7 carbon atoms, particularly preferably an alkyl radical having 1 to 4 carbon atoms, especially an alkyl radical having 1 to 2 carbon atoms, and $R^5$ is preferably an alkoxy radical having 1 to 7 carbon atoms, particularly preferably an alkoxy radical having 1 to 4 carbon atoms, especially an alkoxy radical having 1 to 2 carbon atoms.

Further particularly preferred embodiments are indicated below:
component A comprises at least two compounds selected from the compounds of the formula A1b1 and the formula A1c in which one of the radicals $L^3$ and $L^4$ is H and the other of these radicals is H or F;

component B comprises one or more compounds selected from the formulae B4a and B12a:

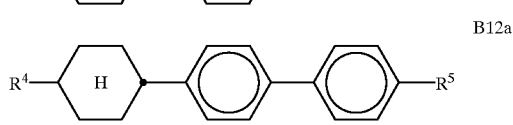

in which $R^4$ and $R^5$ have the preferred meanings given under the compounds of component B. The 1,4-phenylene groups in the compounds of the formula B12a can also be substituted by fluorine. The proportion of these compounds in the liquid-crystal mixtures is from 0 to 35%, preferably from 15 to 30%;

component B comprises one or more compounds of the formula B3;

the liquid-crystal mixture comprises one or more compounds in which R is trans-alkenyl or trans-alkenyloxy;

component T comprises one or more compounds of the formulae T1 or T2.

The mixtures according to the invention are distinguished, in particular when used in SLCDs having high layer thicknesses, by very low overall response times ($t_{on}$+$t_{off}$).

Low overall response times are, in particular, an important criterion for SLCDs used as displays in laptops for enabling interference-free display of cursor movements.

The liquid-crystal mixtures used in the SLCDs according to the invention are dielectrically positive, with $\Delta\epsilon \geq 1$. Particular preference is given to liquid-crystal mixtures in which $\Delta\epsilon \geq 3$, very particularly those in which $\Delta\epsilon \geq 5$.

The liquid-crystal mixtures according to the invention have favorable values for the threshold voltage $V_{(10, 0, 20)}$ and for the rotational viscosity $\gamma_1$. If the value for the optical path difference d·$\Delta$n is specified, the value for the layer thickness d is determined by the optical anisotropy $\Delta$n. In particular at relatively high values for d·$\Delta$n, the use of liquid-crystal mixtures according to the invention having a relatively high value for the optical anisotropy is generally preferred, since the value for d can then be chosen to be relatively small, which results in favorable response time values. However, liquid-crystal displays according to the invention which contain liquid-crystal mixtures according to the invention having smaller values for $\Delta$n are also characterized by advantageous response time values. The liquid-crystal mixtures according to the invention are furthermore characterized by advantageous values for the steepness of the electro-optical characteristic line and can be operated at high multiplex rates. In addition, the liquid-crystal mixtures according to the invention have high stability and favorable values for the electrical resistance and the frequency dependence of the threshold voltage. The liquid-crystal displays according to the invention have a large operating-temperature range and good angle dependence of the contrast.

The construction of the liquid-crystal display elements according to the invention from polarizers, electrode baseplates and electrodes having a surface treatment such that the preferential alignment (director) of the adjacent liquid-crystal molecules in each case is usually twisted from one electrode to the next by 160° to 720°, corresponding to the usual construction for display elements of this type. The term usual construction here is broadly drawn and also covers all derivatives and modifications of the supertwist cell, in particular also matrix display elements and the display elements containing additional magnets. The surface tilt angle at the two outer plates can be identical or different. Identical tilt angles are preferred. In the STN displays, the pretilt angle is from 1° to 30°, preferably from 1° to 12°, in particular from 3° to 8°.

In the display, the twist angle of the STN mixture from alignment layer to alignment layer has a value of between 100° and 600°, preferably between 170° and 300°, in particular between 180° and 270°.

An essential difference between the display elements according to the invention and the conventional display elements based on the twisted nematic cell is, however, the choice of liquid-crystal components in the liquid-crystal layer.

The liquid-crystal mixtures which can be used in accordance with the invention are prepared in a manner conventional per se. In general, the desired amount of the components used in the smaller amount is dissolved in the components making up the principal constituent, advantageously at elevated temperature. It is also possible to mix solutions of the components in an organic solvent, for example in acetone, chloroform or methanol, and, after mixing, to remove the solvent again, for example by distillation.

The dielectrics may also comprise further additives known to the person skilled in the art and described in the literature, for example 0–15% of pleochroic dyes can be added.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. 197 28615.1, filed Jul. 4, 1997 is hereby incorporated by reference.

The symbols have the following meanings:

S-N smectic-nematic phase transition temperature
N-I nematic-isotropic phase transition temperature
Cl.p. clearing point
visc. rotational viscosity (mPa.s)
$t_{on}$ time from switching on until 90% of the maximum contrast is reached
$t_{off}$ time from switching off until 10% of the maximum contrast is reached
steepness $((V_{90}/V_{10})-1) \cdot 100\%$

| | |
|---|---|
| S-N | smectic-nematic phase transition temperature |
| N-I | nematic-isotropic phase transition temperature |
| Cl.p. | clearing point |
| visc. | rotational viscosity (mPa · s) |
| $t_{on}$ | time from switching on until 90% of the maximum contrast is reached |
| $t_{off}$ | time from switching off until 10% of the maximum contrast is reached |
| steepness | $((V_{90}/V_{10}) - 1) \cdot 100\%$ |
| $t_{ave}$ | $\dfrac{t_{on} + t_{off}}{2}$ (average response time) |
| p | pitch |
| $V_{10}$ | threshold voltage = characteristic voltage at a relative contrast of 10% (also abbreviated to $V_{10, 0, 20}$) |
| $V_{90}$ | characteristic voltage at a relative contrast of 90%. | p pitch $V_{10}$ threshold voltage=characteristic voltage at a relative contrast of 10% (also abbreviated to $V_{10, 0, 20}$)

$V_{90}$ characteristic voltage at a relative contrast of 90%.

The SLCD is addressed in multiplex mode (multiplex ratio 1:240, bias 1:16).

The response time and viscosity values relate to a temperature of 20° C. Δn denotes optical anisotropy (589 nm, 20° C).

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is given. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nmF | $C_nH_{2n+1}$ | $C_mH_{2m+1}$ | H | H |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nF.Cl | $C_nH_{2n+1}$ | F | H | Cl |
| nCl.F | $C_nH_{2n+1}$ | Cl | H | F |

TABLE A
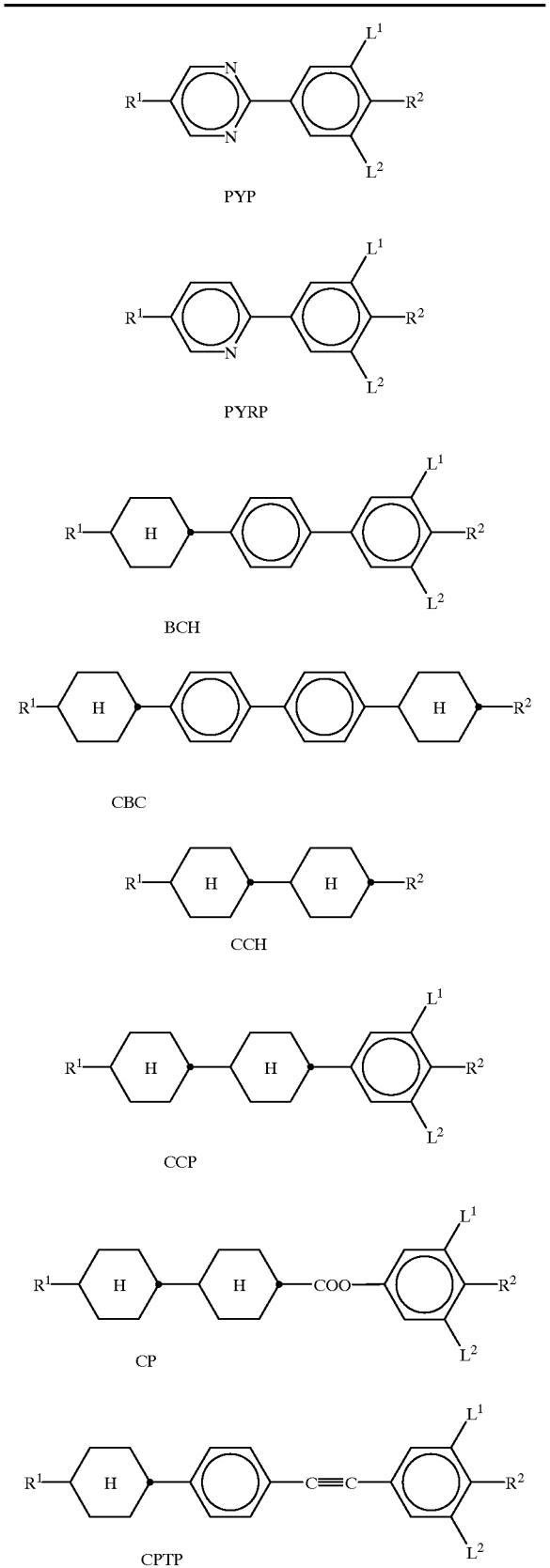
TABLE A-continued
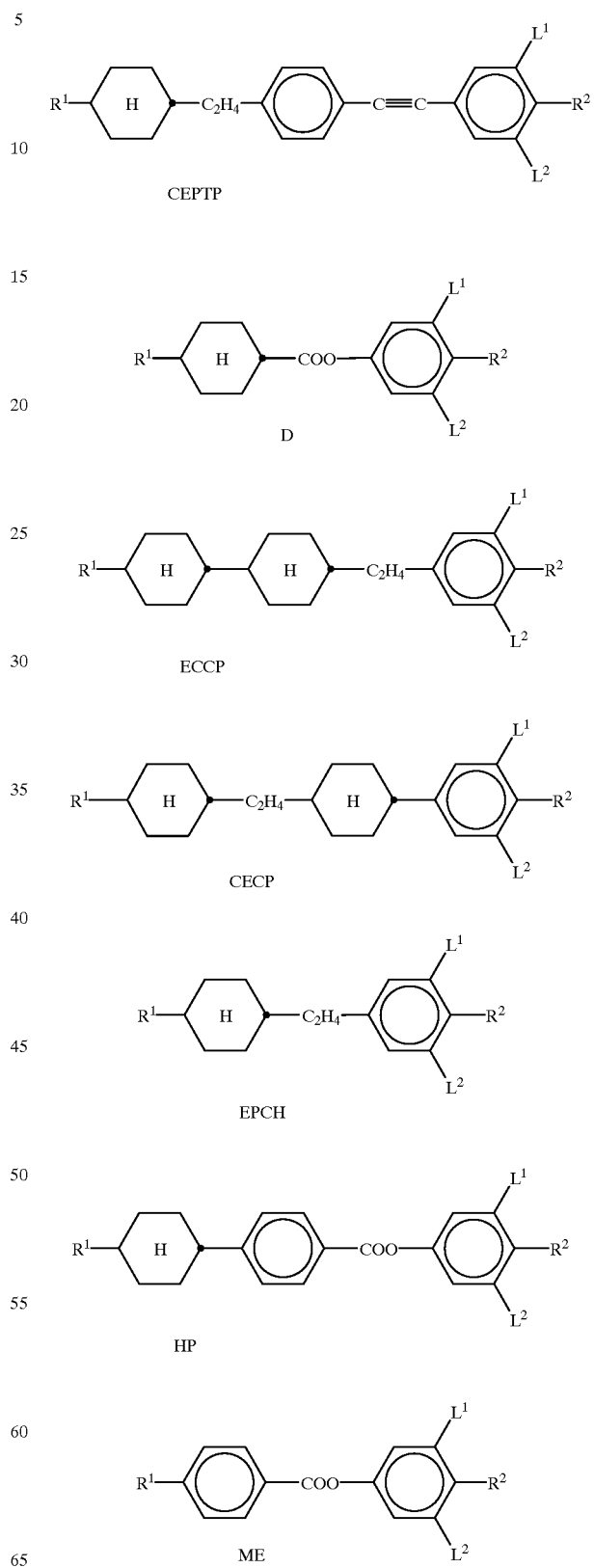

TABLE A-continued
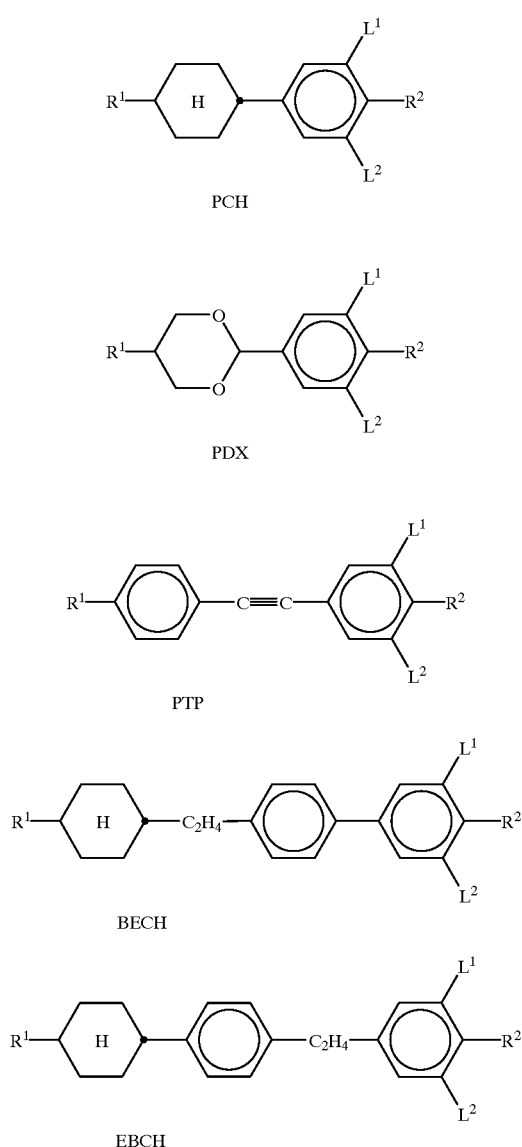
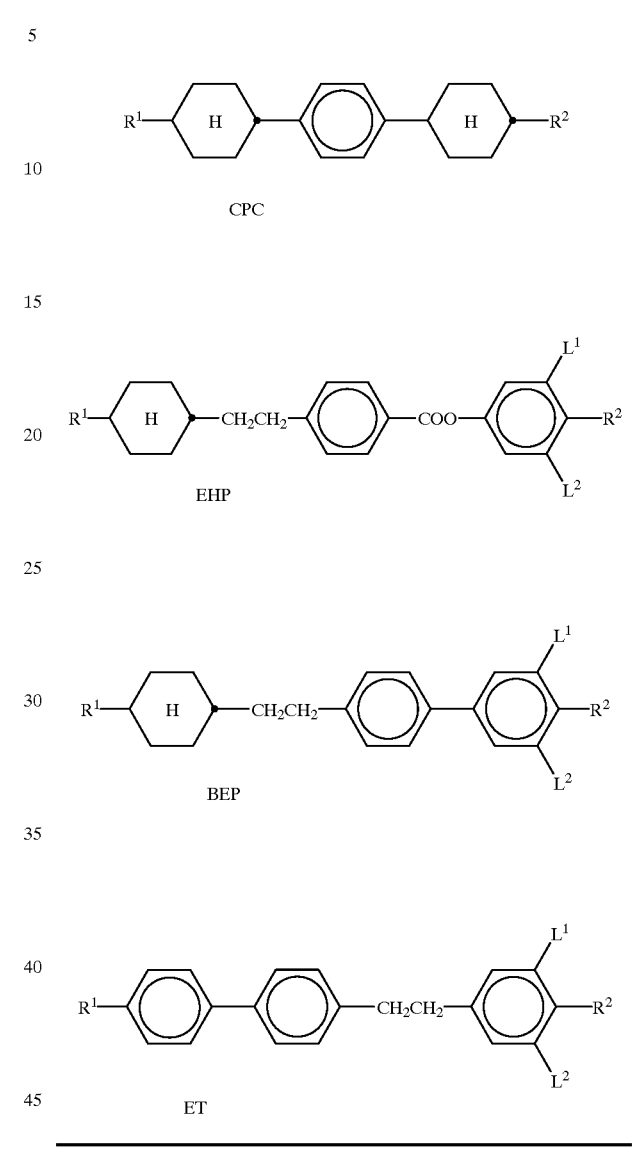
TABLE B
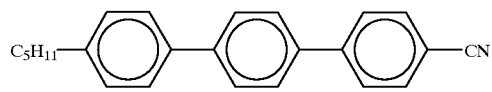
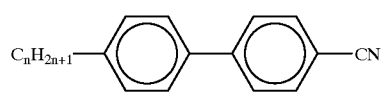

TABLE B-continued
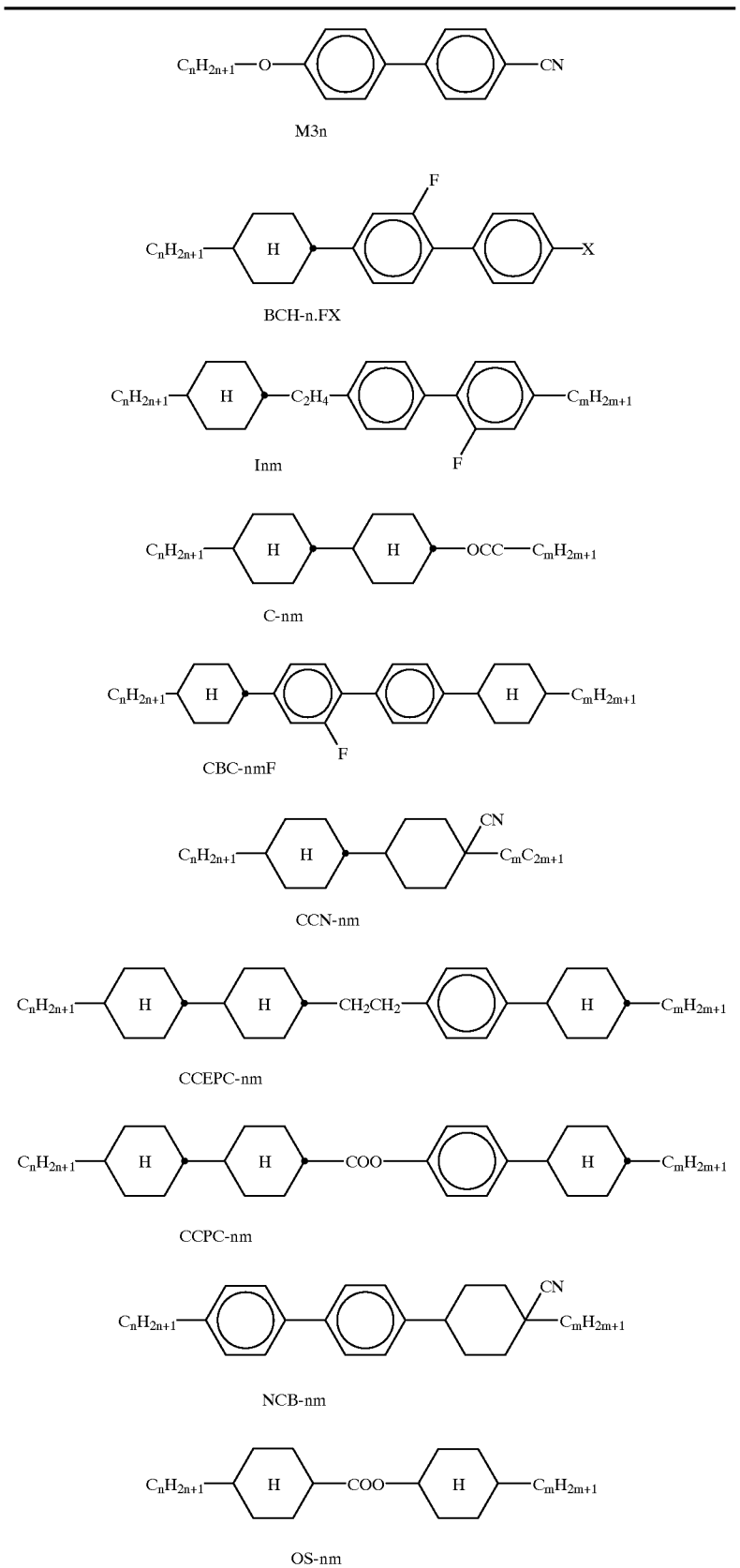

TABLE B-continued
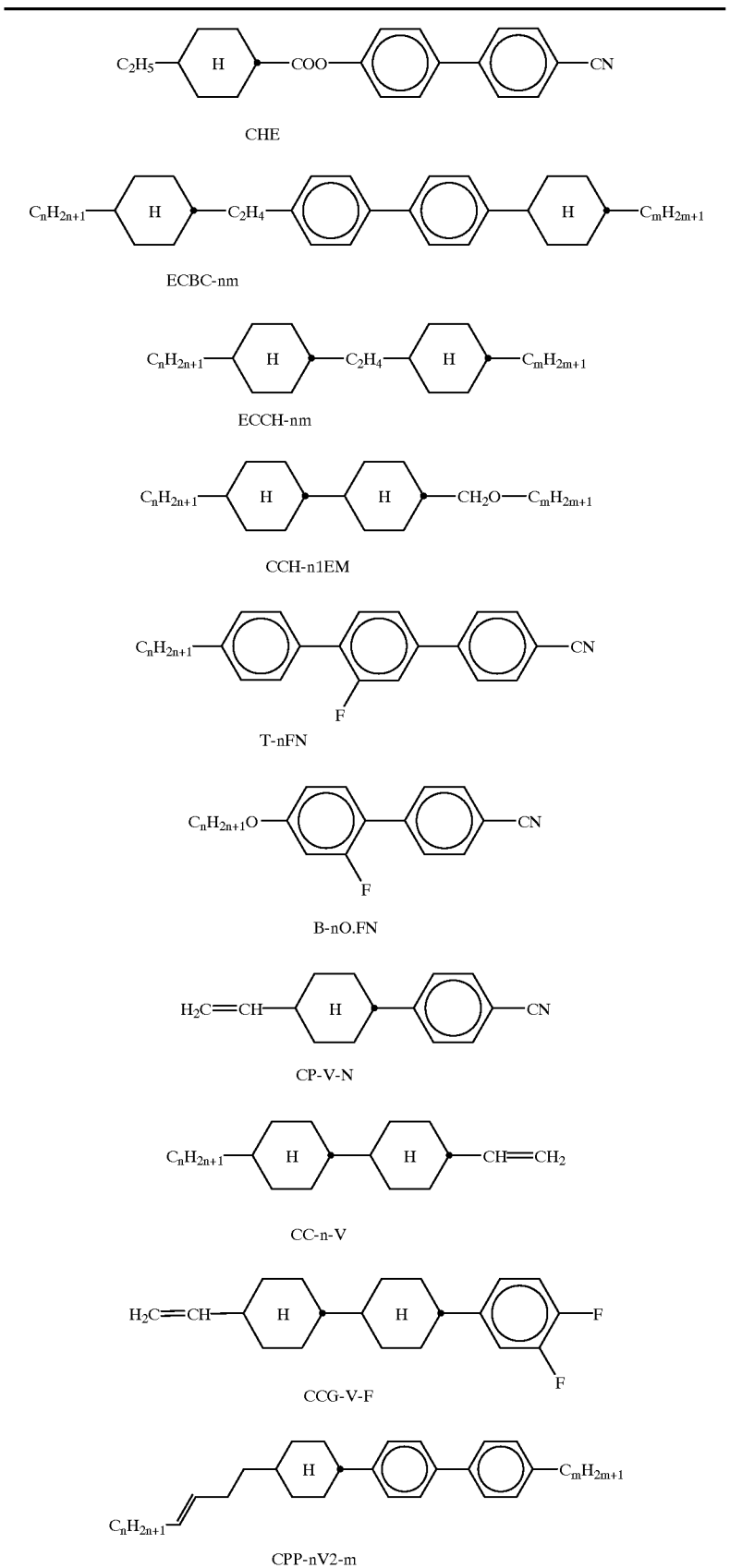

TABLE B-continued

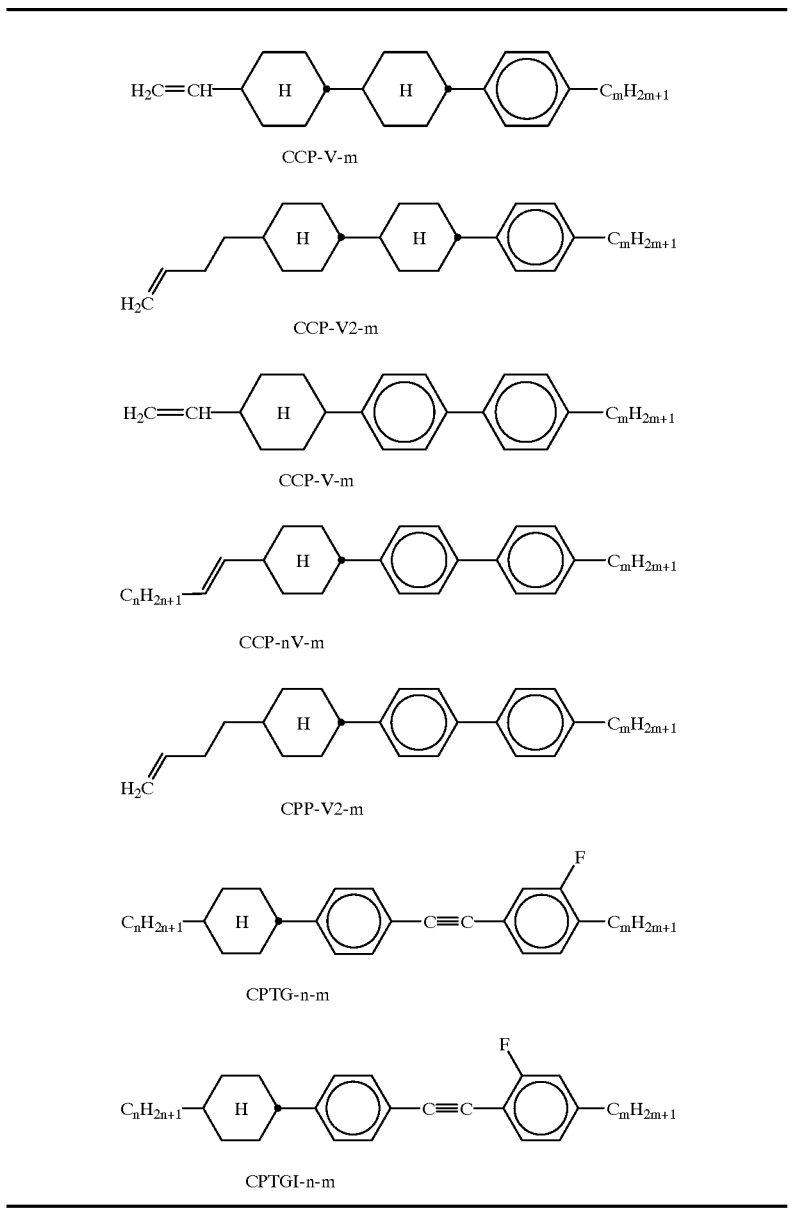

| EXAMPLES | | | |
|---|---|---|---|
| Example A | | | |
| PCH-2 | 10.0 | Clearing point [° C.]: | +103 |
| ME2N.F | 3.0 | $\Delta n$ [589 nm]: | +0.1222 |
| ME3N.F | 3.0 | STN 240° | |
| ME4N.F | 5.0 | d · $\Delta n$ [μm]: | 0.85 |
| CC-5-V | 20.0 | $V_{(10,0,20)}$ [V]: | 2.35 |
| CCP-V-1 | 15.0 | Steepness [%]: | 5.6 |
| CCP-V2-1 | 15.0 | $t_{ave}$ [ms]:. | 286 |
| CCG-V-F | 10.0 | d/p: | 0.53 |
| CPP-1V2-2 | 10.0 | Operating voltage [V]: | 27.8 |
| CPTG-3-1 | 9.0 | | |

-continued

| EXAMPLES | | | |
|---|---|---|---|
| Example B | | | |
| PCH-2 | 10.0 | Clearing point [° C.]: | +105 |
| ME2N.F | 3.0 | $\Delta n$ [589 nm]: | +0.1236 |
| ME3N.F | 3.0 | STN 240° | |
| ME4N.F | 5.0 | d · $\Delta n$ [μm]: | 0.85 |
| CC-5-V | 20.0 | $V_{(20,0,20)}$ [V]: | 2.34 |
| CCP-V-1 | 15.0 | Steepness [%]: | 5.0 |
| CCP-V2-1 | 15.0 | $t_{ave}$ [ms]: | 279 |
| CCG-V-F | 10.0 | d/p: | 0.53 |
| CPP-1V2-2 | 10.0 | Operating voltage [V]: | 27.7 |
| CPTGI-3-1 | 9.0 | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A supertwist liquid-crystal display having
   two plane-parallel outer plates which, together with a frame, form a cell,
   a nematic liquid-crystal mixture of positive dielectric anisotropy which is present in the cell,
   electrode layers with superposed alignment layers on the insides of the outer plates,
   a pitch angle between a longitudinal axis of the molecules at the surface of the outer plates and the outer plates of form about 1 degree to 30 degrees, and
   a twist angle of a liquid-crystal mixture in the cell from alignment layer to alignment layer with a value of between 100 and 600° C.,
   a nematic liquid-crystal mixture comprising
      a) 10–65% by weight of a liquid-crystalline component A consisting of one or more compounds having a dielectric anisotropy of greater than +1.5;
      b) 20–90% by weight of a liquid-crystalline component B consisting of one or more compounds having a dielectric anisotropy of between −1.5 and +1.5;
      c) 5–35% by weight of a liquid-crystalline component T consisting of one or more compounds containing a tolan-4,4'-diyl unit, and
      d) an optically active component C in such an amount that the ratio between the layer thickness (separation of the plane-parallel outer plates) and the natural pitch of the chiral nematic liquid-crystal mixture is from about 0.2 to 1.3,
   wherein component T is at least one compound of the formula I:

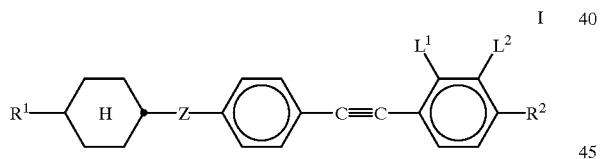

in which
R$^1$ is alkyl, alkoxy, alkenyl or alkenyloxy having 1 to 12 carbon atoms,
R$^2$ is alkyl or alkoxy having 1 to 8 carbon atoms,
Z is —COO—, —CH$_2$CH$_2$— or a single bond,
one of the radicals L$^1$ and L$^2$ is F
and the other is H,
and the liquid-crystal mixture additionally contains at least one compound of the formula I*:

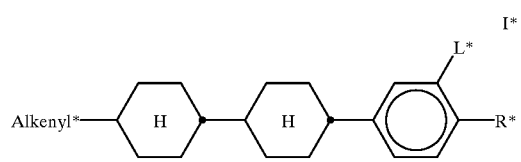

in which
Alkenyl* is an alkenyl radical having up to 7 carbon atoms,

L* is H or F, and
R* is F or an alkyl group having 1 to 12 carbon atoms which is unsubstituted, monosubstituted by CF$_3$ or at least monosubstituted by F, where, in addition, 1 or 2 non-adjacent CH$_2$ groups may be replaced by —O—, —CH=CH—, —CO—, —OCO— or —COO—.

2. A display according to claim 1, wherein component A is at least one compound of the formula A1 and/or A2:

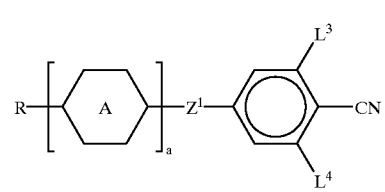

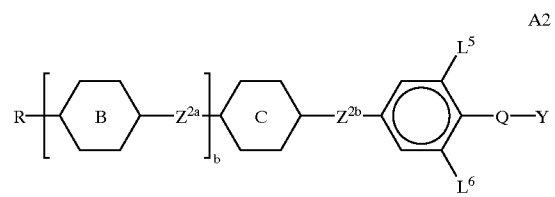

in which
R is an alkyl group having 1 to 12 carbon atoms, in which, in addition one or two non-adjacent CH$_2$ groups may be replaced by —O—, —CH=CH—, —CO—, —OCO— or —COO—,

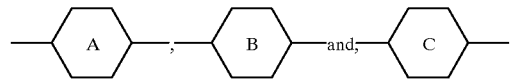

are each, independently of one another,

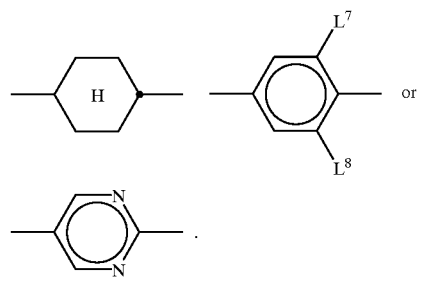

L$^3$–L$^8$ are each, independently of one another, H or F,
Z$^1$, Z$^{2a}$ and Z$^{2b}$ are each, independently of one another, —COO—, —CH$_2$CH$_2$— or a single bond,
Q is —CF$_2$—, —CHF—, —OCF$_2$—, —OCHF— or a single bond,
Y is F or Cl,
a is 1 or 2, and
b is 0 or 1.

3. A display according to claim 2, wherein component A is at least compound of the formulae A1a to A1e:

4. A display according to claim 1, wherein component B is at least one compound of the formulae B1 to B5:

in which

R⁴ and R⁵ each independently an alkyl group having 1 to 12 carbon atoms, in which, in addition one or two non-adjacent CH₂ groups may be replaced by —O—, —CH=CH—, —CO—, —OCO— or —COO—, Z⁴ is —CH₂CH₂—, —CO—O— or a single bond, E is (cyclohexylene/cyclohexenyl/phenylene) and F is (cyclohexylene/cyclohexenylene/H) or (phenylene).

5. A display according to claim 1, wherein component B is at one compound of the formulae B6 to B13:

-continued

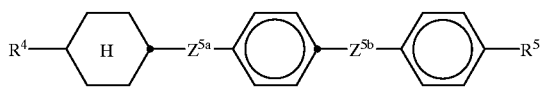
B12

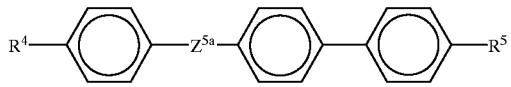
B13 in which
R$^4$ and R$^5$ each independently an alkyl group having 1 to 12 carbon atoms, in which, in addition one or two non-adjacent CH$_2$ groups may be replaced by —O—, —CH=CH—, —CO—, —OCO— or —COO—,

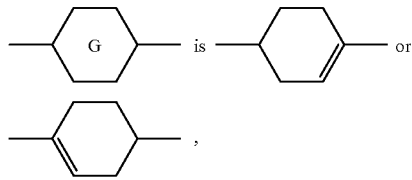

Z$^{5a}$ and Z$^{5b}$ are each, independently of one another, —CH$_2$CH$_2$— or a single bond, and
u is from 1 to 12,
and wherein the 1,4-phenylene groups in B7, B8, B9, B12 and B13 may also each, independently of one another, be monosubstituted or polysubstituted by fluorine, with the proviso that the compounds of formula B8 are different from the compounds of formula I*.

6. A display according to claim 1, wherein the liquid-crystal mixture comprises at least one compound of the formula B4a:

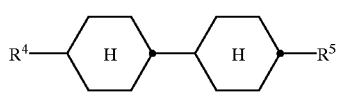
B4a in which
R$^4$ and R$^5$ are each, independently of one another, trans-H—(CH$_2$)$_q$—CH=CH—(CH$_2$CH$_2$)$_b$—, or
R$^4$ is trans-H—(CH$_2$)$_q$—CH=CH—(CH$_2$C$_2$)$_b$—, and
R$^5$ is CH$_3$—(CH$_2$)$_p$—,
b is 0 or 1,
q is 0, 1, 2 or 3, and
p is 1, 2, 3 or 4.

7. A display according to claim 1, wherein component T is at least one compound of the formulae IA and/or IB:

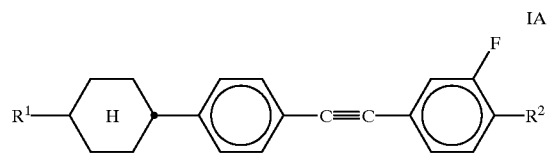
IA

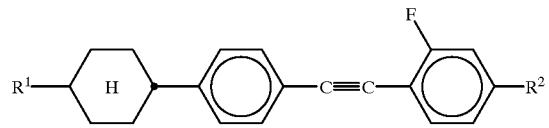
IB in which

R$^1$ and R$^2$ are each, independently of one another, straight-chain alkyl having 1 to 5 carbon atoms.

8. A display according to claim 1, wherein component T is at least one tolan compound of the formulae T1a to T2b:

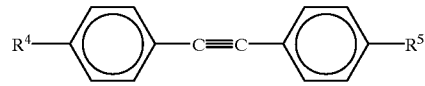
T1a

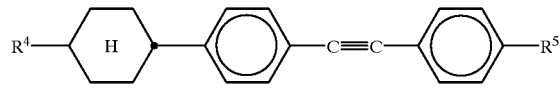
T2a

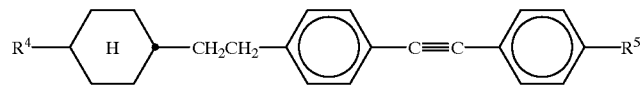
T2b in which

R$^4$ is an alkyl radical having 1 to 4 carbon atoms and

R$^5$ is an alkoxy radical having 1 to 4 carbon atoms.

9. A display according to claim 1, wherein component B is at least one compound of the formulae I*A to I*C:

I*C

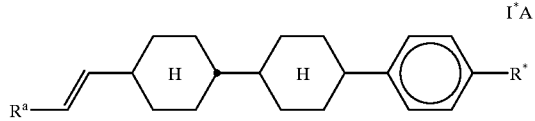
I*A

-continued

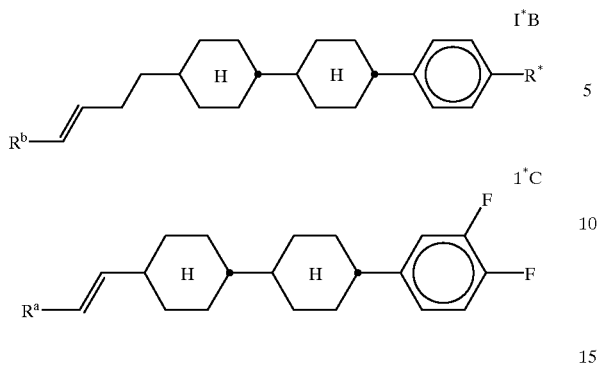

in which
R$^a$ is H or an alkyl radical having up to 5 carbon atoms, and
R$^b$ is H or an alkyl radical having up to 3 carbon atoms.

10. A nematic liquid-crystal mixture comprising
   a) 10–65% by weight of a liquid-crystalline component A consisting of one or more compounds having a dielectric anisotropy of greater than +1.5;
   b) 20–90% by weight of a liquid-crystalline component B consisting of one or more compounds having a dielectric anisotropy of between −1.5 and +1.5;
   c) 5–35% by weight of a liquid-crystalline component T consisting of one or more compounds containing a tolan-4,4'-diyl unit, and
   d) an optically active component C in such an amount that the ratio between the layer thickness (separation of the plane-parallel outer plates) and the natural pitch of the chiral nematic liquid-crystal mixture is from about 0.2 to 1.3, wherein component T is at least one compound of the formula I:

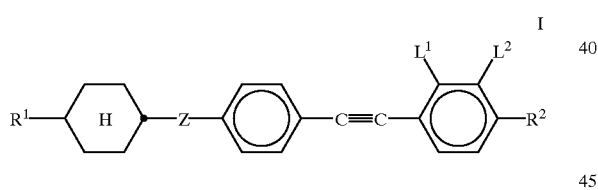

in which
R$^1$ is alkyl, alkoxy, alkenyl or alkenyloxy having 1 to 12 carbon atoms,
R$^2$ is alkyl or alkoxy having 1 to 8 carbon atoms,
Z is —COO—, —CH$_2$CH$_2$— or a single bond,
one of the radicals L$^1$ and L$^2$ is F and the other is H,
and the liquid-crystal mixture additionally contains at least one compound of the formula I*:

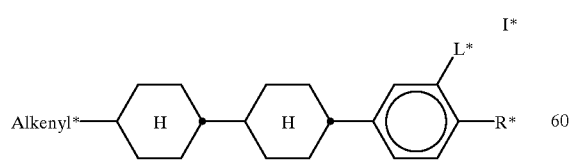

in which
Alkenyl* is an alkenyl radical having up to 7 carbon atoms,
L* is H or F, and R* is F or an alkyl group having 1 to 12 carbon atoms which is unsubstituted, monosubstituted by CF$_3$ or at least monosubstituted by F, where, in addition, 1 or 2 non-adjacent CH$_2$ groups may be replaced by —O—, —CH=CH—, —CO—, —OCO— or —COO—.

11. A mixture according to claim 10, wherein component A is at least one compound of the formula A1 and/or A2:

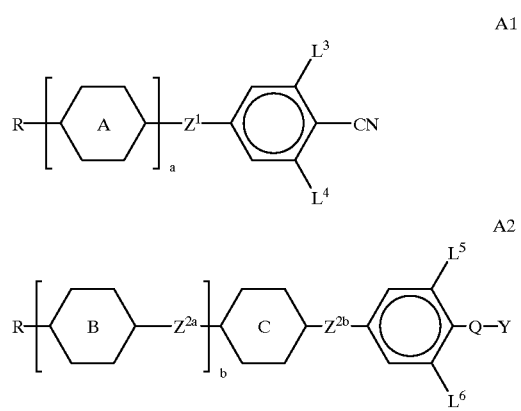

in which
R is an alkyl group having 1 to 12 carbon atoms, in which, in addition one or two non-adjacent CH$_2$ groups may be replaced by —O—, —CH=CH—, —CO—, —OCO— or —COO—,

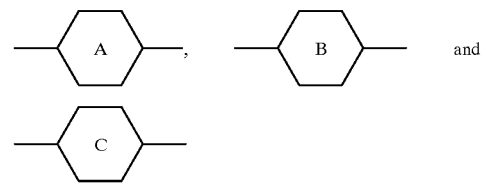

are each, independently of one another,

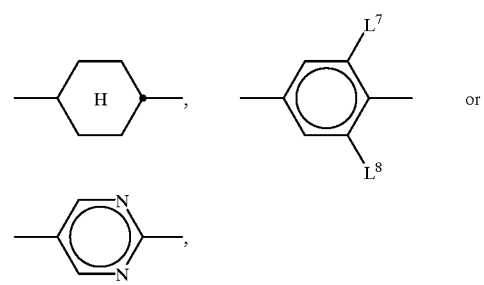

L$^3$–L$^8$ are each, independently of one another, H or F,
Z$^1$, Z$^{2a}$ and Z$^{2b}$ are each, independently of one another, —COO—, —CH$_2$CH$_2$— or a single bond,
Q is —CF$_2$—, —CHF—, —OCF$_2$—, —OCHF— or a single bond,
Y is F or Cl,
a is 1 or 2, and
b is 0 or 1.

12. A mixture according to claim 11, wherein component A is at least one compound of the formulae A1a to A1e:

A1a 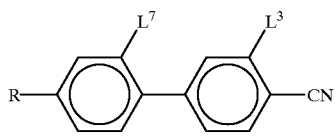

A1b1 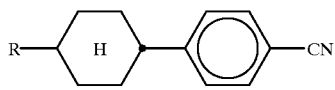

A1b2 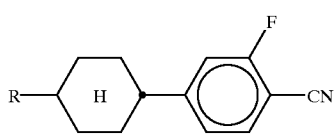

A1b3 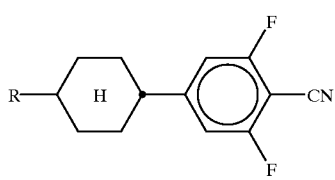

A1c 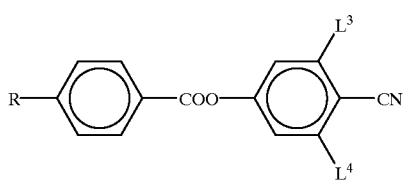

A1d 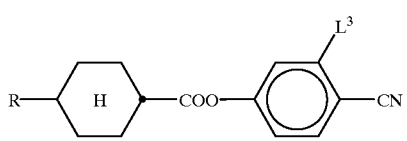

A1e 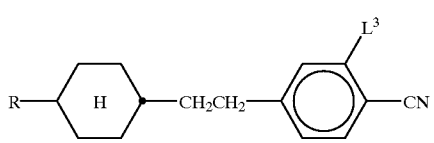

13. A mixture according to claim 10, wherein component B is at least one compound of the formulae B1 to B5:

B1 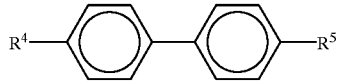

B2 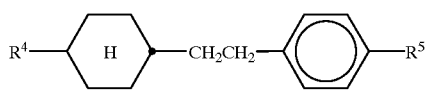

B3 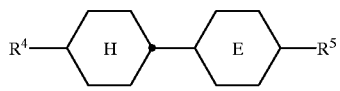

B4 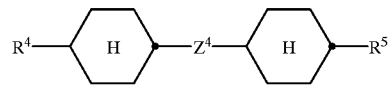

B5 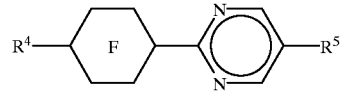

in which $R^4$ and $R^5$ are each independently an alkyl group having 1 to 12 carbon atoms, in which, in addition one or two non-adjacent $CH_2$ groups may be replaced by —O—, —CH=CH—, —CO—, —OCO— or —COO—, $Z^4$ is —$CH_2CH_2$—, —CO—O— or a single bond,

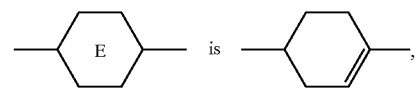

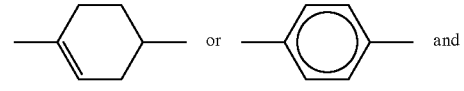

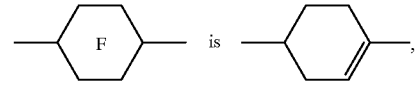

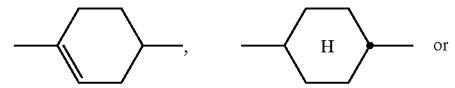

14. A mixture according to claim 10, wherein component B is at least one compound of the formulae B6 to B13:

B6 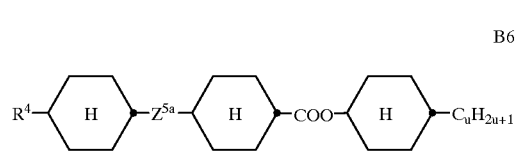

B7 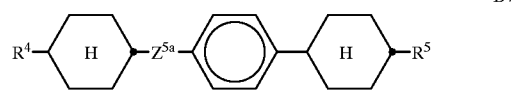

B8 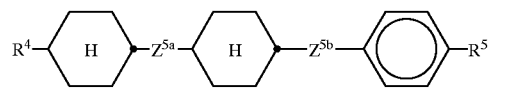

B9 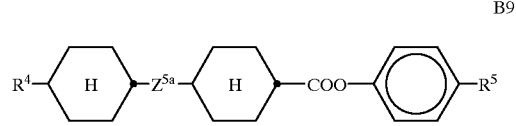

B10 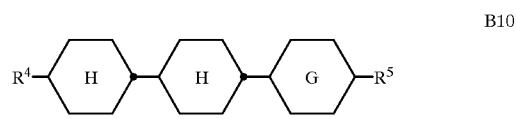

-continued

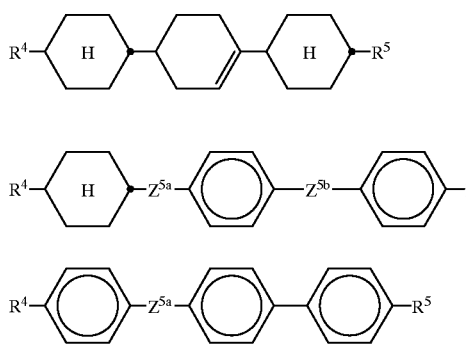

in which

R⁴ and R⁵ are each independently an alkyl group having 1 to 12 carbon atoms, in which, in addition one or two non-adjacent CH₂ groups may be replaced by —O—, —CH=CH—, —CO—, —OCO— or —COO—,

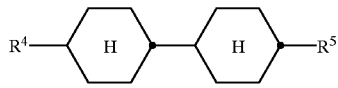

$Z^{5a}$ and $Z^{5b}$ are each, independently of one another, —CH₂CH₂— or a single bond, and u is from 1 to 12, and wherein the 1,4-phenylene groups in B7, B8, B9, B12 and B13 may also each, independently of one another, be monosubstituted or polysubstituted by fluorine, and with the proviso that the compounds of formula B8 are different from the compounds of formula I*.

15. A mixture according to claim 10 wherein the liquid-crystal mixture comprises at least one compound of the formula B4a:

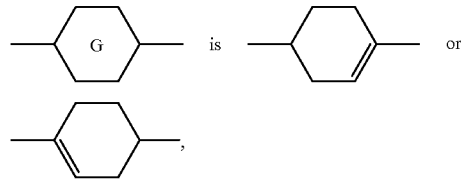

in which

R⁴ and R⁵ are each, independently of one another, trans-H—(CH₂)$_q$—CH=CH—(CH₂CH₂)$_b$— or R⁴ is trans-H—(CH₂)$_q$—CH=CH—(C₂C₂)$_b$—, and R⁵ is CH₃—(CH₂)$_p$—, b is 0 or 1, q is 0, 1, 2 or 3, and p is 1, 2, 3 or 4.

16. A mixture according to claim 10, wherein component T is at least one compound of the formulae IA and/or IB:

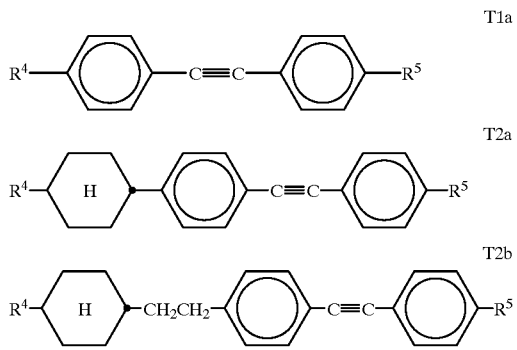

in which

R¹ and R² are each, independently of one another, straight-chain alkyl having 1 to 5 carbon atoms.

17. A mixture according to claim 10, wherein component T is at least one tolan compound of the formulae T1a to T2b:

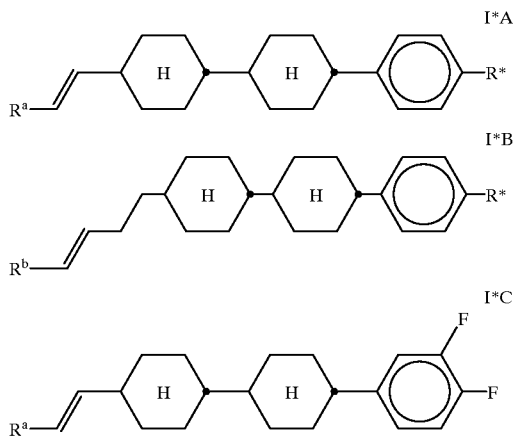

in which

R⁴ is an alkyl radical having 1 to 4 carbon atoms, and

R⁵ is an alkoxy radical having 1 to 4 carbon atoms.

18. A mixture according to claim 10, wherein component B is at least one compound of the formulae I*A to I*C:

in which

R$^a$ is H or an alkyl radical having up to 5 carbon atoms, and

R$^b$ is H or an alkyl radical having up to 3 carbon atoms.

* * * * *